United States Patent
Roussel-Garcia et al.

(10) Patent No.: US 12,358,236 B2
(45) Date of Patent: Jul. 15, 2025

(54) COUNTER-ELEMENT FOR ULTRASONIC MACHINING

(71) Applicant: HERRMANN ULTRASCHALLTECHNIK GMBH & CO. KG, Karlsbad (DE)

(72) Inventors: Raquel Roussel-Garcia, Pforzheim (DE); Robin Alexander Bode, Pforzheim (DE); Timo Zink, Karlsruhe (DE)

(73) Assignee: HERRMANN ULTRASCHALLTECHNIK GMBH & CO. KG, Karlsbad (DE)

( * ) Notice: Subject to any disclaimer, the term of this patent is extended or adjusted under 35 U.S.C. 154(b) by 247 days.

(21) Appl. No.: 18/256,177

(22) PCT Filed: Nov. 30, 2021

(86) PCT No.: PCT/EP2021/083652
§ 371 (c)(1),
(2) Date: Jun. 6, 2023

(87) PCT Pub. No.: WO2022/122487
PCT Pub. Date: Jun. 16, 2022

(65) Prior Publication Data
US 2024/0034001 A1  Feb. 1, 2024

(30) Foreign Application Priority Data
Dec. 7, 2020  (DE) .................. 102020132523.1

(51) Int. Cl.
*B29C 65/08* (2006.01)
*B29C 65/00* (2006.01)
*B29L 31/48* (2006.01)

(52) U.S. Cl.
CPC ........ *B29C 65/086* (2013.01); *B29C 66/1122* (2013.01); *B29C 66/43* (2013.01);
(Continued)

(58) Field of Classification Search
CPC ...................................... B29C 65/08
See application file for complete search history.

(56) References Cited

U.S. PATENT DOCUMENTS 4,531,999 A * 7/1985 Persson ............. B29C 66/81433
156/580.2
5,840,154 A * 11/1998 Wittmaier ......... B29C 66/81423
156/580.2
(Continued)

FOREIGN PATENT DOCUMENTS

DE  2154057 A1  5/1972
DE  2833577 A1  2/1980
(Continued)

OTHER PUBLICATIONS

International Preliminary Report on Patentability for corresponding International Patent Application No. PCT/EP2021/083652 dated Mar. 10, 2023—English Translation; priority document.
(Continued)

*Primary Examiner* — Jeffry H Aftergut
(74) *Attorney, Agent, or Firm* — Greer, Burns & Crain, Ltd.

(57) ABSTRACT

A counter-element for processing a material by means of ultrasound, the counter-element having a sealing surface, the sealing surface having a welding portion which is at least partially concavely curved. The sealing surface has a feed-in portion which is arranged adjoining the weld portion and is either not curved or is concavely curved with a radius of curvature that is larger than the radius of curvature of the welding portion.

19 Claims, 5 Drawing Sheets

(52) U.S. Cl.
CPC ...... *B29C 66/7294* (2013.01); *B29C 66/7392* (2013.01); *B29C 66/81415* (2013.01); *B29C 66/81423* (2013.01); *B29C 66/83511* (2013.01); *B29L 2031/4878* (2013.01)

(56) References Cited

U.S. PATENT DOCUMENTS

| | | | |
|---|---|---|---|
| 9,138,937 B2 * | 9/2015 | Frank | B29C 66/21 |
| 1,089,066 A1 | 1/2021 | Begrow et al. | |
| 2004/0226645 A1 | 11/2004 | Owen | |
| 2010/0243172 A1 | 9/2010 | Blanchard et al. | |
| 2012/0143164 A1 | 6/2012 | Frank et al. | |
| 2017/0266872 A1 | 9/2017 | Vogler | |

FOREIGN PATENT DOCUMENTS

| | | |
|---|---|---|
| DE | 102014115538 A1 | 4/2016 |
| DE | 102017119273 A1 | 2/2019 |
| EP | 1477293 B1 | 8/2015 |
| EP | 2063842 B1 | 11/2016 |
| EP | 3209433 B1 | 12/2018 |
| EP | 3094468 B1 | 1/2020 |
| JP | S55154119 A | 12/1980 |
| JP | 2017533827 A | 11/2017 |
| WO | WO-2008/034593 A2 * | 3/2008 |
| WO | 2018064340 A1 | 4/2018 |
| WO | WO-2021/043943 A1 * | 3/2021 |
| WO | 2022097455 A1 | 5/2022 |

OTHER PUBLICATIONS

International Search Report and Written Opinion for corresponding International Patent Application No. PCT/EP2021083652 dated Mar. 11, 2022; priority document.

German Search Report for corresponding German Patent Application No. 102020132523.1 dated Oct. 14, 2021; priority document.

* cited by examiner

COUNTER-ELEMENT FOR ULTRASONIC MACHINING

CROSS-REFERENCES TO RELATED APPLICATIONS

This application is a national phase of International Patent Application No. PCT/EP2021/083652, filed on Nov. 30, 2021, which claims the benefit of German Patent Application No. 10 2020 132 523.1, filed on Dec. 7, 2020, the entire disclosures of which are incorporated herein by way of reference.

FIELD OF THE INVENTION

The present invention relates to a counter-element for ultrasonic processing of a material, for example a sonotrode or an anvil.

BACKGROUND OF THE INVENTION

Ultrasound is increasingly being used, in particular, for joining nonwoven materials. For this, two portions of nonwoven fabric to be joined together are introduced on top of one another into a gap between a sonotrode and an anvil and ultrasonic vibration is applied to the sonotrode. On the mutually contacting surfaces, due to the friction induced by the ultrasonic vibration, punctiform heating occurs, so that, in particular, thermoplastic components of the nonwoven material are melted. The melted constituents of portions of material to be joined flow into one another and provide a firm bond upon cooling thereof.

Thus, it is possible to join together corresponding nonwoven material portions to form a side seam in the production of diapers.

Typically, a processing element is positioned to the side of the counter-element so that the material to be processed, such as a system of multiple webs of material, can be disposed in or moved through a gap between the counter-element and the processing element while ultrasonic oscillation is applied to the material to be processed, at least by the counter-element or the processing element.

Therein, the processing element can have a substantially cylindrical or cylindrical segment-shaped support surface intended to come into contact with the material during processing. The processing element is then rotated about its longitudinal axis during processing such that the support surface rolls over the material to be processed.

Therein, the support surface often comprises at least one structural element which projects in a radial direction above the support surface so that the structural element comprises an upper side which is intended to contact the material to be processed. The actual welding is then carried out in the region between the upper side of the structural element and a sealing surface of a counter-element arranged spaced therefrom for this purpose.

For example, the counter-element can be a sonotrode and the processing element can be an anvil. In the following, the invention is described using this example, since this is the preferred embodiment. In principle, however, it is possible to configure the processing element as a sonotrode and the counter-element as an anvil.

During the processing, the support surface rolls with the structural elements on the material to be processed so that the structural elements, in particular, bring about a welding.

The processing speed is limited with the devices of the prior art.

In principle, the feed velocity, i.e., the velocity at which the material is moved through the gap between the processing element and the counter-element, can be increased.

However, since the sonotrode acts upon the material at a fixed frequency, sufficient energy is then no longer introduced into the material to enable reliable welding. This is because, at a higher feed rate, the material comes into contact with the sealing surface of the sonotrode for a shorter time, and therefore fewer "impacts" of the sonotrode are applied to the material.

This can be partially compensated for by increasing the force with which the sonotrode is pressed onto the material to be processed. As a result, more energy is transferred into the material "per impact" of the sonotrode. However, this leads to greater friction and results in the molten components formed by the ultrasonic processing at the boundary areas between the layers of material to be welded, i.e., in the so-called joining zone, being pushed by the structural elements out of the joining zone, which also leads to a poorer seam, since sufficient amounts of thermoplastic components are no longer available in the joining zone. Alternatively or in combination, the vibration amplitude of the ultrasonic vibration could also be increased. Again, hereby more energy is transferred into the material "per impact" of the sonotrode. However, this is only possible to a limited extent. If the sonotrode is operated at too high a vibration amplitude, damage to the sonotrode material can occur.

In order to achieve a higher processing speed, so-called "welding wheels" have previously been used, in which a plurality of sonotrodes are arranged on a wheel in order to increase the contact time during the rotational movement of the wheel. However, this solution is very complex.

Proceeding from the described prior art, it is therefore an object of the present invention to specify a counter-element with which reliable welding at a higher feed rate is possible.

SUMMARY OF THE INVENTION

According to the invention, this object may be achieved in that the counter-element has a sealing surface with a welding portion that is at least partially concavely curved.

As a result of the sectional curvature of the welding portion, the contact time between the counter-element and the processing element becomes increased so that more energy can be introduced into the material, by means of which the feed velocity is also increased, without having to increase the force with which the sonotrode or the anvil is pressed onto the material to be processed.

In a further preferred embodiment, the sealing surface of the counter-element comprises a feed-in portion which is arranged adjacent to the welding portion and which is either not curved, is convexly curved, or is concavely curved with a radius of curvature that is greater than the radius of curvature of the welding portion. Thereby the slope or the curvature of the sealing surface changes at the transition between the feed-in portion and the welding portion, such that when a counter-element with a cylindrical or cylindrical segment-shaped support surface is used in the region of the feed-in portion, the spacing between the processing element and the support surface of the counter-element becomes successively smaller until the smallest spacing is achieved, which then corresponds to the spacing between the welding portion and the support surface and/or between the welding portion and the upper side of the structural element arranged on the support surface. This feed-in portion is arranged such that a material moved in the feed direction through the gap comes into contact firstly with the feed-in portion and then with the welding portion. In a preferred embodiment, the feed-in portion is either not curved or is concavely curved with a radius of curvature that is greater than the radius of curvature of the welding portion.

In a preferred embodiment, the feed-in portion is between 0.2 times and 5 times as large as the welding portion. It is therein particularly preferred if the feed-in portion and the welding portion are approximately the same size.

The aforementioned object is also achieved with an ultrasonic welding apparatus having a counter-element, as described above, and a processing element, wherein the processing element has a substantially cylindrical or cylindrical segment-shaped support surface, which is provided to come into contact with the material during processing, wherein the processing element is provided to be rotated about its longitudinal axis during processing so that the support surface moves in a circumferential direction and rolls over the material to be processed, wherein the sealing surface of the counter-element can be arranged opposite to the processing element, so that a gap forms between the support surface and the sealing surface, in which a material to be processed can be arranged, wherein in a sectional view perpendicular to the longitudinal axis of the processing element, the welding portion is at least partially concavely curved.

In particular, in that the aforementioned counter-element cooperates with a processing element having a substantially cylindrical or cylindrical segment-shaped support surface, the length of time during which ultrasonic processing takes place is increased. In a preferred embodiment, the support surface is cylindrical or cylindrical segment-shaped, wherein minor deviations do not compromise the effect according to the invention.

In a particularly preferred embodiment, the ultrasonic welding apparatus is configured and designed so that a web of material or a plurality of webs of material can be moved between the processing element and the counter-element. A take-off roll or a plurality of take-off rolls can be provided on which the webs of material to be processed are wound and from which the material is pulled off and moved through the gap between the processing element and the counter-element. It is also possible to provide a web guide roller or a plurality of web guide rollers that guide the webs of material to be processed between the processing element and the counter-element.

In a further preferred embodiment, it is provided that arranged on the support surface is at least one structural element, which protrudes radially above the substantially cylindrical or cylindrical segment-shaped support surface, wherein the structural element has an upper side, which is provided to come into contact with the material to be processed, wherein the upper side comprises a base portion and at least one recess portion which is at a smaller spacing from the longitudinal axis than the base portion, wherein in a sectional view perpendicular to the longitudinal axis, the base portion and the recess portion are arranged adjoining one another.

As the structural element rolls over the material, plasticized components can be incorporated in the recess portion so that the described pushing out of the plasticized components from the joining zone is reduced.

In a preferred embodiment, the recess formed by the recess portion does not extend to the support surface but preferably has a depth of less than 1 mm and most preferably between 0.05 mm and 0.2 mm.

In a further preferred embodiment, the recess portion is configured as a groove, which is preferably not oriented solely in the circumferential direction. If the groove is oriented in the circumferential direction, the groove preferably does not fully surround the support surface circumferentially, but only extends over a circumferential angle of <360° and more preferably over a circumferential angle of less than 45° and most preferably less than 25°. It is also possible for a plurality of grooves to be arranged circumferentially, spaced from one another.

The groove is not intended to interrupt the welding, but rather merely to receive molten material so that it remains substantially in place and can serve to join the layers of material.

It has been found that this groove can stop the detrimental delocalization of the melt, due to the increased pressure of the sonotrode on the material to be processed, at the site of the groove. The melt is then only moved as far as the groove. The groove thus serves as a receptacle for the melt material.

In a preferred embodiment, the groove has a width that is less than 1 mm and preferably less than 0.6 mm. The width of the groove is most preferably between 0.2 and 0.4 mm.

Depending on the material to be welded, it can be sufficient if the groove has a cross-sectional area of less than $0.15 \text{ mm}^2$. Preferably, the cross-sectional area is even less than $0.05 \text{ mm}^2$ and most preferably the cross-sectional area is between $0.015 \text{ mm}^2$ and $0.04 \text{ mm}^2$.

In a preferred embodiment, the structural element comprises a plurality of grooves, preferably at least three grooves, in the upper side which are not oriented in the circumferential direction, wherein preferably the grooves are arranged parallel to one another. The grooves make it possible to hold the molten material in the respective position, and therefore a plurality of grooves is advantageous.

In a further preferred embodiment, it is provided that the upper side of the structural element has a main portion which is configured substantially planar or with a convex curvature having a radius of curvature corresponding to the spacing of the main portion from the cylinder axis and has at least one bevel portion which adjoins the main portion in the circumferential direction. The bevel portion is either angled relative to the main portion such that the main portion and the bevel portion enclose an angle of less than 180°, or the bevel portion is convexly curved, wherein, if the main portion is convexly curved, the radius of curvature of the bevel portion is smaller than the radius of curvature of the main portion. Therein, the at least one recess portion is preferably arranged in the main portion. The bevel portion serves to prepare the material gradually for the welding contact between the main portion and the counter-element. At the transition between the main portion and the bevel portion, the slope or curvature of the upper side changes. This ensures that when the processing element is used, the spacing between the structural element and the counter-element continuously decreases until the smallest spacing between the structural element and the counter-element has been reached.

In a further preferred embodiment, it is provided that the upper side comprises two circumferentially adjoining bevel portions on opposite sides on the main portion, which are angled relative to the main portion such that the main portion and the bevel portion include an angle, in each case, of less than 180°. In the processing, the upper side of the structural element thus not only has a feeding-in bevel portion, but also a feeding-out bevel portion, whereby the force applied by the counter-element to the processing element is only reduced gradually at the end of the processing of the structural element.

In a further preferred embodiment, the upper side of the structural element has an elongate shape with a length l and a width b, where l>b. The length preferably does not extend parallel to the longitudinal axis, but preferably substantially perpendicularly to it.

In a further preferred embodiment, it is provided that the processing element is intended to be rotated in a feed direction in which a material to be processed is passed between the processing element and the counter-element, wherein the feed-in portion and the welding portion are arranged such that a material moved in the feed direction through the gap initially comes into contact with the feed-in portion and then with the welding portion.

As mentioned above, the counter-element can be a sonotrode and the processing element can be an anvil.

Further advantages, characteristics, and possible applications of the present invention will become apparent from the following description of a preferred embodiment and the corresponding figures.

DETAILED DESCRIPTION OF THE PREFERRED EMBODIMENTS

Figure 1:
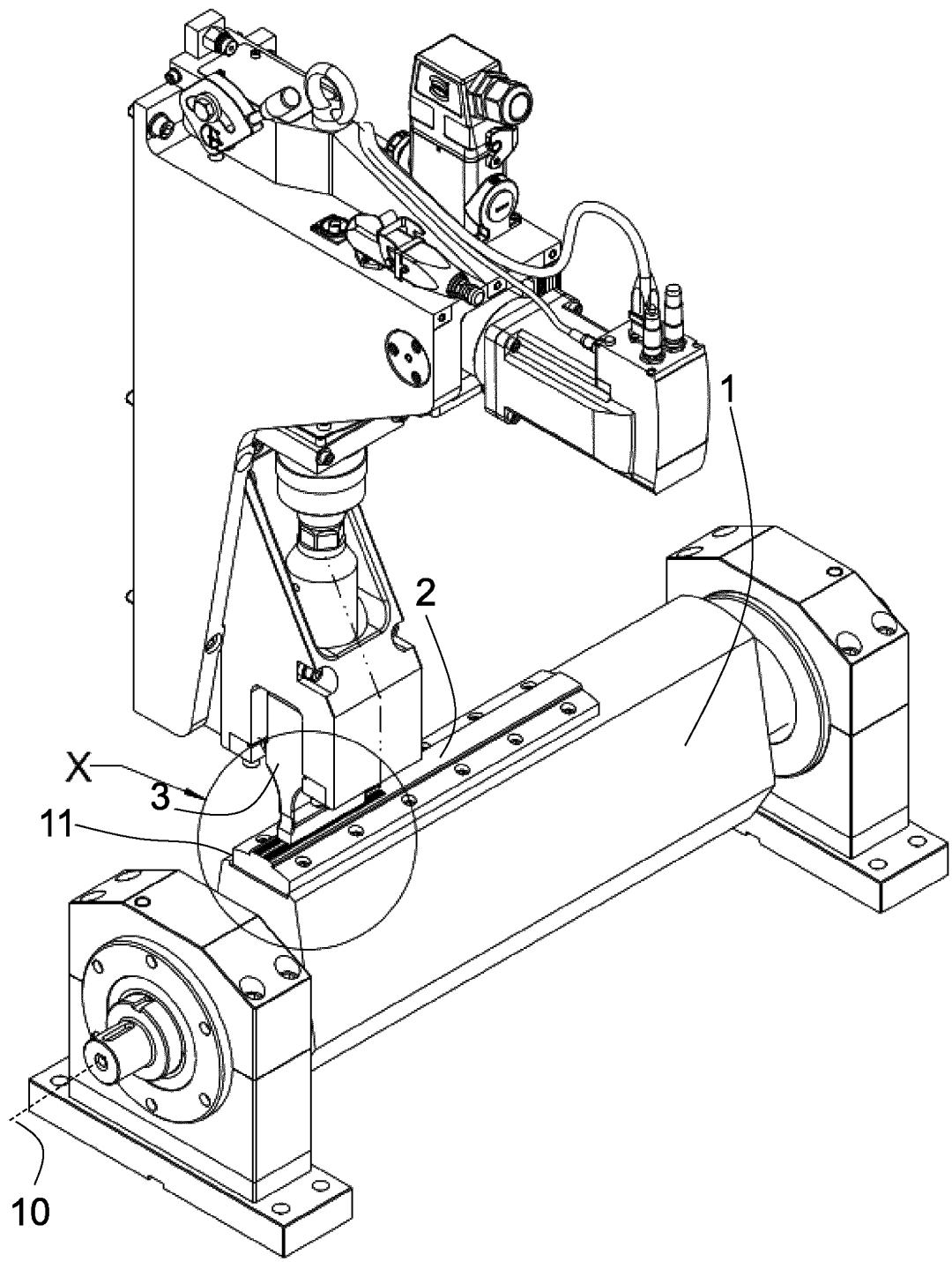
FIG. 1 shows an ultrasonic welding apparatus in a perspective view.

FIG. 1 shows a perspective view of an ultrasonic welding system. The ultrasonic welding system comprises a processing element 1 configured as an anvil, which is embodied here as a roller that is rotatable about a longitudinal axis 10. At least one transverse seam bar 11 with a support surface 2 is disposed on the roller. A counter-element 3, which is configured as a sonotrode, is arranged opposite thereto.

The counter-element 3 can herein be excited with an ultrasonic oscillation. The material to be processed is then moved between the support surface 2 and the sealing surface of the sonotrode 3 facing the support surface 2, wherein the velocity of movement of the material matches the circumferential velocity of the processing element 1. The gap between the support surface 2 and the sonotrode 3 must be selected such that the ultrasonic vibration is transferred to the material during processing and melting of the thermoplastic components takes place at the boundary surfaces.

Figure 2:
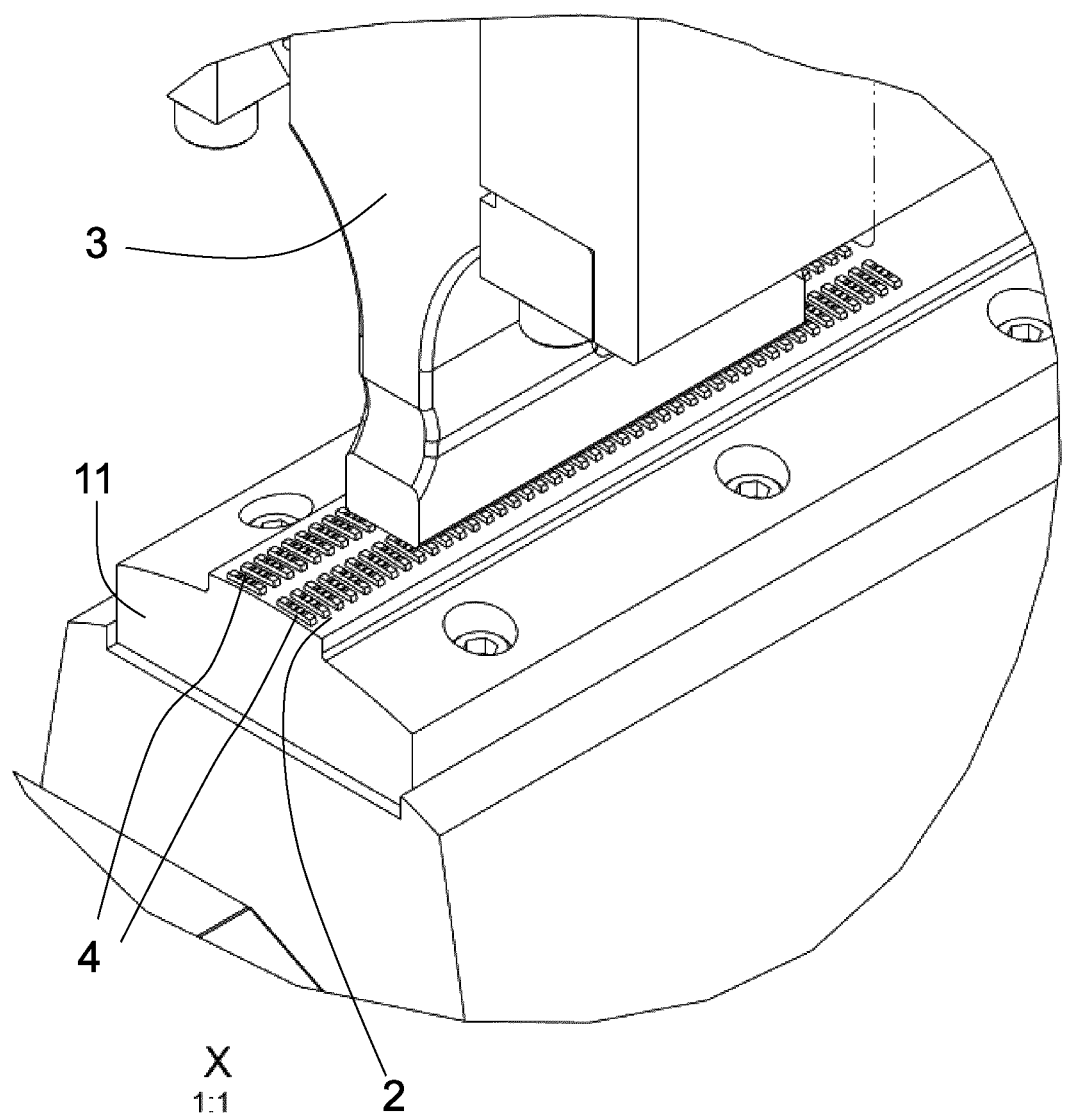
FIG. 2 shows an enlarged detail of the region of FIG. 1 indicated with X.

FIG. 2 shows an enlarged detail of FIG. 1.

It can be seen that a plurality of structural elements 4 are arranged on the support surface 2. The structural elements 4 have an elongate shape that is oriented in the circumferential direction. The structural elements 4 come into contact with the material during processing and determine the weld pattern introduced into the material during processing. For example, the ultrasonic welding system can be used to create side seams of diapers made of non-woven material.

Figure 3:
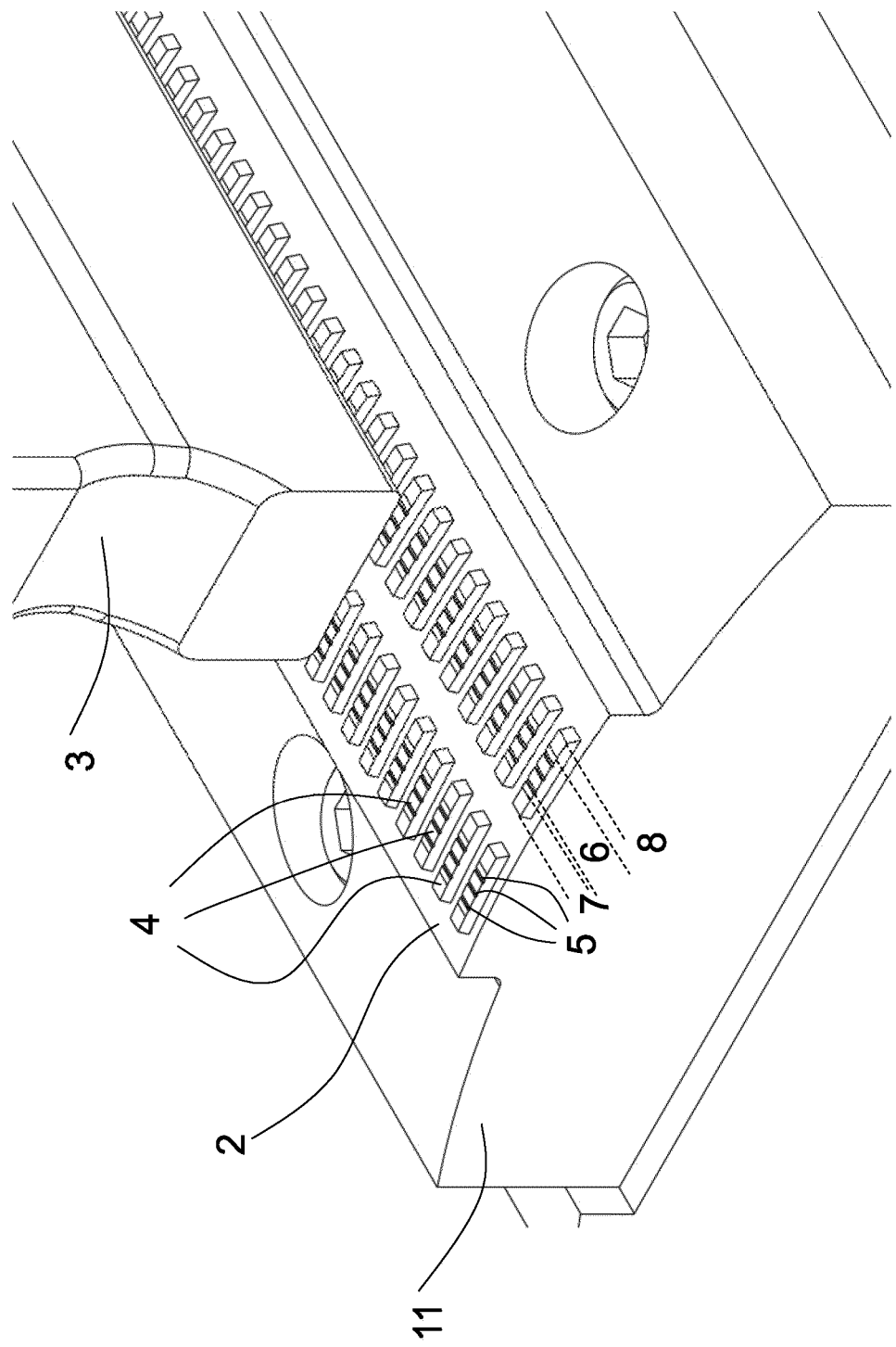
FIG. 3 shows an enlarged detail of FIG. 2.

In FIG. 3, an enlarged detail of FIG. 2 is shown, in which the structural elements 4 are clearly apparent. In the circumferential direction (relative to the longitudinal axis 10), two structural elements 4 are arranged adjoining one another. In the axial direction, a plurality of such pairs of structural element pairs are arranged adjoining one another.

Each structural element has a main portion 6 as well as two bevel portions 7, 8 that are more strongly curved than the main portion 6. Grooves 5 have been introduced into the main portion 6, which in the embodiment shown extend perpendicularly to the circumferential direction. It is not necessary for the grooves to extend perpendicularly to the circumferential direction. However, in order to achieve the effect according to the invention, they should not be arranged parallel to the circumferential direction. If the grooves are indeed arranged parallel to the circumferential direction, they should not extend across the entire structural element 4.

In the welding processing, the structural elements 4 roll over the material to be processed so that firstly the bevel portion 8 comes into contact with the material to be processed. Due to the angled arrangement of the bevel portion 8, the spacing between the structural element 4 and the oppositely arranged sealing surface of the counter-element 3 decreases successively in this region until the smallest spacing is achieved in the region of the main portion 6. The main portion 6 can be formed convexly curved, wherein the radius of curvature substantially corresponds to the spacing between the upper side of the structural element 4 and the longitudinal axis 10 of the processing element 1.

The grooves 5 are introduced into the main portion 6 with a depth of 0.1 mm and a width of 0.3 mm. Molten material can penetrate into the recesses resulting therefrom, so that it remains substantially in place and is not squeezed out of the joining zone by the structural elements.

Figure 4:
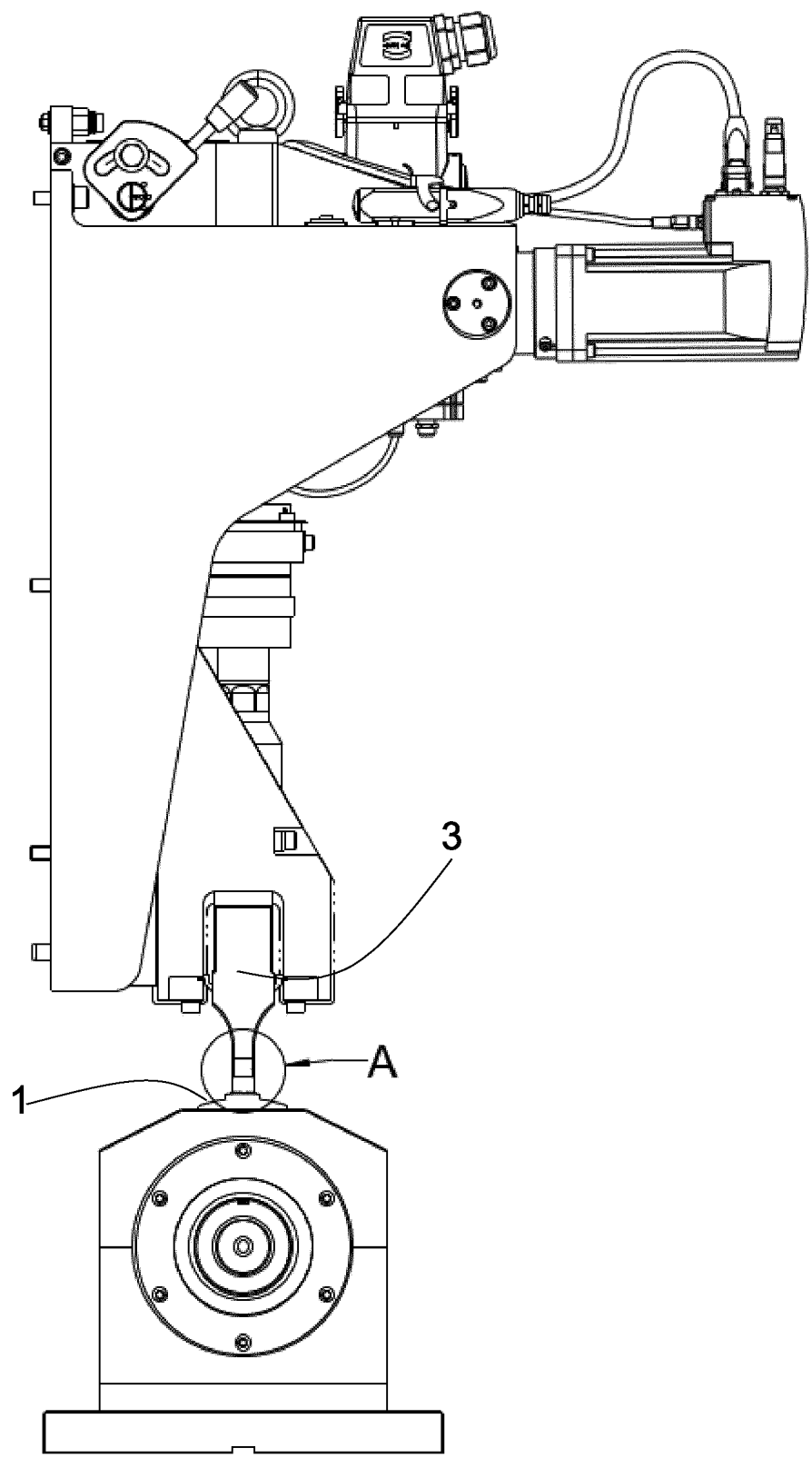
FIG. 4 shows a side view of the ultrasonic welding apparatus of FIG. 1.

FIG. 4 shows a side view of the ultrasonic welding apparatus of FIG. 1. The sealing surface, i.e., the surface facing the support surface and/or the structural elements 4, is the surface 9.

Figure 5:
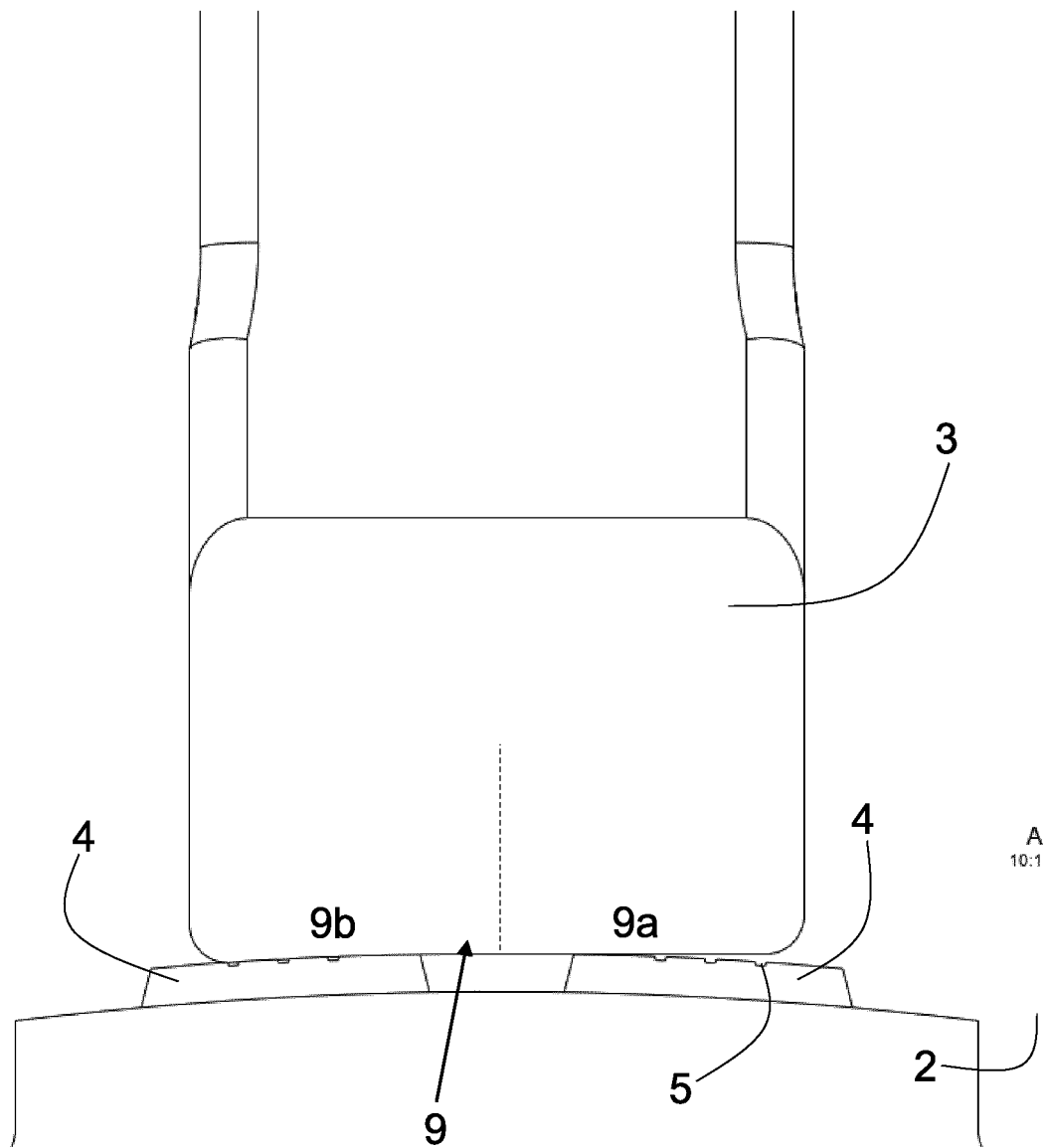
FIG. 5 shows an enlarged partial view of FIG. 4.

FIG. 5 shows an enlarged partial view of FIG. 4. The surface 9 here consists of a feed-in portion 9a and a welding portion 9b. The welding portion 9b is concavely curved, specifically with substantially the same radius of curvature as the radius of curvature of the main portion of the processing element. This measure ensures that, during the processing, the material remains in contact with the sonotrode for longer so that more energy can be introduced into the material to be processed. In this embodiment, the feed-in portion 9a is not formed curved and thereby ensures that the material to be processed is first guided into a narrowing gap in the region of the feed-in portion 9a. The welding portion and the feed-in portion are approximately the same size. In the region of the welding portion 9b, the gap is then minimal and is kept substantially constant in the region of the welding portion. The welding is primarily carried out by the welding portion 9b, but the feed-in portion 9a can already contribute to the welding at its end facing the welding portion 9b.

The dashed line shows the boundary between the feed-in portion 9a and the welding portion 9b. In the embodiment shown, this boundary is arranged in the center of the sealing surface 9 so that the feed-in portion 9a and the welding portion 9b are the same size. The boundary should preferably be arranged such that the welding portion occupies between 20% and 80%, preferably between 30% and 70% of the surface 9.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 Processing element (anvil)
2 Support surface
3 Counter-element (sonotrode)
4 Structural elements
5 Grooves
6 Main portion
7, 8 Bevel portions
9 Sealing surface
9a Feed-in portion
9b Welding portion
10 Longitudinal axis
11 Transverse seam bar

The invention claimed is:

1. A counter-element for processing a material with ultrasound, the counter-element comprising:
a sealing surface, the sealing surface having a welding portion which is at least partially concavely curved,
wherein the sealing surface comprises a feed-in portion which is arranged adjoining the welding portion and is either convexly curved or is concavely curved with a radius of curvature that is larger than the radius of curvature of the welding portion.

2. The counter-element according to claim 1, wherein the feed-in portion and the welding portion are equal in size.

3. The counter-element according to claim 1, wherein the counter-element is a sonotrode.

4. An ultrasonic welding apparatus comprising:
the counter-element according to claim 1, and
a processing element, wherein the processing element has a cylindrical segment-shaped support surface, which is intended to contact with the material during processing,
wherein the processing element is configured to be rotated about a longitudinal axis of the processing element during the processing such that the support surface moves in a circumferential direction and rolls over the material to be processed,
wherein the sealing surface of the counter-element is arranged opposite to the processing element such that a gap forms between the support surface and the sealing surface, in which the material to is arranged,
wherein in a sectional view perpendicular to the longitudinal axis of the processing element, the welding portion is at least partially concavely curved.

5. The ultrasonic welding apparatus according to claim 4 further comprising:
at least one structural element, arranged on the support surface, which protrudes radially above the cylindrical segment-shaped support surface,
wherein the at least one structural element has an upper side which contacts with the material,
wherein the upper side comprises a base portion and at least one recess portion which has a smaller spacing from the longitudinal axis than the base portion,
wherein in a sectional view perpendicular to the longitudinal axis, the base portion and the at least one recess portion are arranged adjoining one another.

6. The ultrasonic welding apparatus according to claim 5, wherein a recess formed by the at least one recess portion does not extend to the support surface.

7. The ultrasonic welding apparatus according to claim 6, wherein the recess has a depth of less than 1 mm.

8. The ultrasonic welding apparatus according to claim 6, wherein the recess has a depth between 0.05 mm and 0.2 mm.

9. The ultrasonic welding apparatus according to claim 5, wherein the at least one recess portion is configured as a groove.

10. The ultrasonic welding apparatus according to claim 9, wherein the groove is not oriented in the circumferential direction.

11. The ultrasonic welding apparatus according to claim 9, wherein the groove has a width that is less than 1 mm.

12. The ultrasonic welding apparatus according to claim 9, wherein the groove has a width that is between 0.2 mm and 0.4 mm.

13. The ultrasonic welding apparatus according to claim 9, wherein the groove has a cross-sectional area of less than $0.15$ mm$^2$.

14. The ultrasonic welding apparatus according to claim 9, wherein the structural element has a plurality of grooves in the upper side, which are not oriented in the circumferential direction.

15. The ultrasonic welding apparatus according to claim 5, wherein the upper side has a main portion which is configured planar or having a convex curvature with a radius of curvature which corresponds to the spacing of the main portion from the cylinder axis, and has at least one bevel portion which adjoins the main portion in the circumferential direction and which is either angled relative to the main portion, such that main portion and the at least one bevel portion enclose an angle of <180°, or is convexly curved, or both,
wherein when the main portion is convexly curved, a radius of curvature of the at least one bevel portion is less than the radius of curvature of the main portion.

16. The ultrasonic welding apparatus according to claim 15, wherein the main portion of the processing element is convexly curved with a radius of curvature that approximately corresponds to the radius of curvature of the concavely curved portion of the counter-element.

17. The ultrasonic welding apparatus according to claim 5 further comprising:
at least two structural elements which are spaced from one another in the circumferential direction, or the processing element is configured as an anvil, or the upper side has an elongate form having a length l and a width b, wherein l>b, or any combination thereof.

18. The ultrasonic welding apparatus according to claim 4, wherein the processing element is configured to be rotated in a feed direction, in which the material to be processed is moved between the processing element and the counter-element,
wherein the feed-in portion and the welding portion are arranged in such a way that the material, moved in the feed direction, through the gap initially comes into contact with the feed-in portion and then with the welding portion.

19. The ultrasonic welding apparatus according to claim 4 further comprising:
at least one take-off roller on which a web of material to be processed is wound, or at least one web guide roller which guides a web of material to be processed, or both, and wherein any take-off roller and/or web guide roller is arranged such that one or more webs of material are configured to be moved between the processing element and the counter-element.

* * * * *